United States Patent
Subramanian et al.

(10) Patent No.: US 9,268,644 B1
(45) Date of Patent: Feb. 23, 2016

(54) SYSTEMS AND METHODS FOR RAID ACCELERATION

(75) Inventors: Srikumar Subramanian, Newark, CA (US); Sankarji Gopalakrishnan, Fremont, CA (US); Narayanaswami Ganapathy, Newark, CA (US); Paresh Chatterjee, Fremont, CA (US); Udita Chatterjee, legal representative, Kolkatta (IN)

(73) Assignee: American Megatrends, Inc., Norcross, GA (US)

( * ) Notice: Subject to any disclaimer, the term of this patent is extended or adjusted under 35 U.S.C. 154(b) by 40 days.

(21) Appl. No.: 13/449,628

(22) Filed: Apr. 18, 2012

Related U.S. Application Data

(60) Provisional application No. 61/476,722, filed on Apr. 18, 2011.

(51) Int. Cl.
*G06F 11/14* (2006.01)

(52) U.S. Cl.
CPC .... *G06F 11/1435* (2013.01); *G06F 2211/1004* (2013.01); *G06F 2211/1007* (2013.01); *G06F 2211/1057* (2013.01)

(58) Field of Classification Search
CPC ............ G06F 11/1435; G06F 11/1092; G06F 3/0617; G06F 2211/1057; G06F 11/1076
USPC ................. 711/114, 113, 165; 714/6.21, 6.22
See application file for complete search history.

(56) References Cited

U.S. PATENT DOCUMENTS

| | | | |
|---|---|---|---|
| 5,333,305 A * | 7/1994 | Neufeld ........................ | 714/5.11 |
| 5,978,856 A * | 11/1999 | Jones ............................. | 711/114 |
| 6,381,674 B2 * | 4/2002 | DeKoning et al. ............ | 711/113 |
| 6,493,804 B1 | 12/2002 | Soltis et al. | |
| 6,745,284 B1 * | 6/2004 | Lee et al. ...................... | 711/114 |
| 6,775,794 B1 * | 8/2004 | Horst et al. .................... | 714/42 |
| 6,976,124 B2 * | 12/2005 | Morita et al. ................. | 711/114 |
| 7,062,605 B2 * | 6/2006 | Chatterjee et al. ............ | 711/114 |
| 7,231,409 B1 * | 6/2007 | Chen ..................................... | 1/1 |
| 7,689,766 B1 * | 3/2010 | Chatterjee et al. ............ | 711/113 |
| 7,707,151 B1 | 4/2010 | Blumenau et al. | |
| 7,721,146 B2 | 5/2010 | Polisetti et al. | |
| 2002/0161972 A1 * | 10/2002 | Talagala et al. ............... | 711/114 |

(Continued)

OTHER PUBLICATIONS

Wu et al, "JOR: A Journal-guided Reconstruction Optimization for RAID Structured Storage Systems", 2009, 15th International Conference on Parallel and Distributed Systems, pp. (609-618).*

(Continued)

*Primary Examiner* — David X Yi
*Assistant Examiner* — Kamal Dewan
(74) *Attorney, Agent, or Firm* — Meunier Carlin & Curfman LLC

(57) ABSTRACT

A RAID module for a RAID controller that includes a thin RAID layer and a thin disk layer. The thin RAID layer sits between an operating system layer and a RAID stack, and intercepts and fields requests and I/Os made the between operating system and the RAID stack. The thin disk layer sits between the RAID stack and the disks that comprise the array, and intercepts and fields requests and I/Os made between the RAID stack and the array. The module may maintain a bitmap with an entry corresponding to each stripe of the array. When the module detects that a stripe has zero data, the entry in the bitmap for the stripe is set to 0. When the module detects that data has been written to a stripe, the entry in the bitmap for the stripe is set to 1.

4 Claims, 3 Drawing Sheets

(56) References Cited

U.S. PATENT DOCUMENTS

| | | |
|---|---|---|
| 2005/0050383 A1 | 3/2005 | Horn et al. |
| 2005/0229033 A1 | 10/2005 | Tanaka et al. |
| 2005/0246503 A1* | 11/2005 | Fair ............................... 711/147 |
| 2005/0283655 A1 | 12/2005 | Ashmore |
| 2006/0136627 A1 | 6/2006 | Maity et al. |
| 2006/0149999 A1 | 7/2006 | Hung |
| 2007/0036055 A1 | 2/2007 | Ito |
| 2007/0174670 A1 | 7/2007 | Terry et al. |
| 2007/0174849 A1 | 7/2007 | Cheung et al. |
| 2008/0155220 A1* | 6/2008 | Edwards ....................... 711/170 |
| 2009/0172273 A1* | 7/2009 | Piszczek et al. .............. 711/114 |
| 2010/0037091 A1 | 2/2010 | Baderdinni et al. |
| 2011/0022889 A1 | 1/2011 | Suenaga |

OTHER PUBLICATIONS

Klein, Roger, How to Manage Disk Media Errors, InfoStor, Jan. 1, 1998, retrieved from the internet on Apr. 22, 2014 from http://www.infostor.com/index/articles/display/55873/articles/infostor/volume-2/issue-1/news-analysis-trends/how-to-manage-disk-media-errors.html, 4 pages.

* cited by examiner

SYSTEMS AND METHODS FOR RAID ACCELERATION

CROSS-REFERENCE TO RELATED APPLICATION

The present application is a non-provisional of U.S. Provisional Patent Application No. 61/476,722, filed Apr. 18, 2011, entitled "SYSTEMS AND METHODS FOR RAID ACCELERATION," which is incorporated herein by reference in its entirety.

BACKGROUND

Though RAID has been commoditized for quite some time now, it has been under constant threat due to the nature of evolution in disk drive technology. Being mechanical in design, disk drives have not made any noticeable improvements in performance and latency, whereas over the years their capacities have grown substantially. For example, disk capacities have been doubling almost every year and a half without any improvement in performance.

As a result of this imbalance between size and performance, the time to perform certain RAID related functions has steadily increased. For example, the time to rebuild an array of disks has grown almost astronomically. Similarly, the times required to check consistency, patrol read operations, and to initialize an array have also dramatically increased.

There are many drawbacks associated with long rebuilding times. For example, a RAID system may become very slow and appear less responsive to users during rebuilding. In addition, longer rebuild times drastically increases the overall risk of RAID systems to failure. While rebuilding the RAID system is in a vulnerable state; any disk failures or medium errors may hurt system availability and may result in irrevocable data losses.

Long RAID initialization times also have associated drawbacks. RAID initialization is used for RAID-5 and RAID-6 systems to improve I/O performance and is typically performed in the background making the RAID system available for I/Os while the initialization is taking place. However, such background processes degrade the performance of the RAID systems, which is exacerbated due to larger and larger disk drives.

SUMMARY

A RAID module is added to a RAID controller. The module includes a thin RAID layer and a thin disk layer. The thin RAID layer sits between an operating system layer and a RAID stack, and intercepts and fields requests and I/Os made between the operating system and the RAID stack. The thin disk layer sits between the RAID stack and the disks that comprise the array, and intercepts and fields requests and I/Os made between the RAID stack and the array. In addition, the module maintains a bitmap with an entry corresponding to each stripe of the array. When the module detects that a stripe has zero data (regardless of data that may be stored in the stripe), the entry in the bitmap for the stripe is set to 0. When the module detects that data has been written to a stripe, the entry in the bitmap for the stripe is set to 1. The bitmap may be used to increase the performance of initialization and rebuilding operations for the array, because stripes that are known to contain zero data may be ignored.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
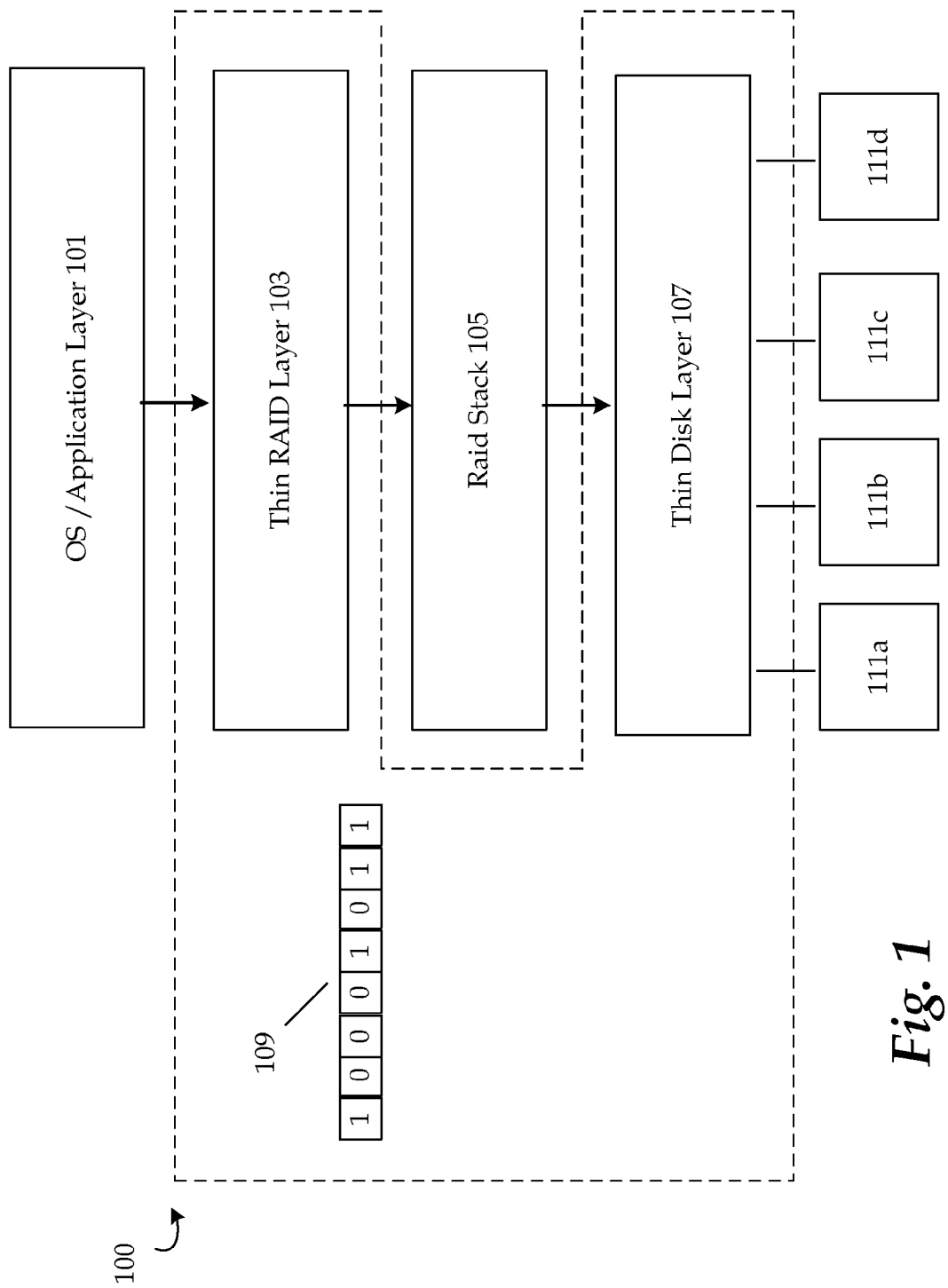
FIG. 1 is a diagram showing an illustrative operating environment for the use of a module in a RAID system.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing improved bad block handling in a RAID environment.

Turning now to FIG. 1, details will be provided regarding what is referred to herein as a module 100. As shown the module 100 may include a thin RAID layer 103, a thin disk layer 107, and a bitmap 109. The module 100 may be a software module and may be designed to operate with an existing software RAID controller. For example, the module 100 may be a plug-in to an existing RAID controller.

In particular, the module 100 may act as multiple intermediate layers between an operating system/application layer 101, a RAID stack 105, and a plurality of volumes 111*a*, 111*b*, 111*c*, and 111*d*. The volumes 111*a*-111*d* may form a RAID array that is managed by the RAID stack 105. The RAID may be a variety of RAID types including, but not limited to, RAID-0, 1, 2, 3, 4, 5, 6 etc. Moreover, more or fewer volumes 111*a*-111*d* may be supported. In some implementations, the volumes may each comprise a physical hard disk drive. Other types of volumes may be used such as network volumes, virtual volumes, and logical volumes.

The bitmap 109 may include an entry for each stripe from the logical array (i.e., volumes 111*a*-111*d*). In some implementations, one bitmap 109 may cover the entire array, in other implementations; each volume 111*a*-111*d* may have its own associated bitmap 109. The bitmap 109 may be stored as part of the module 100, and/or may be stored across the volumes 111a-111d. Other data structures may also be used. In some implementations, the bitmap 109 may not have entries for stripes associated with parity data or parity volumes, for example.

Each entry in the bitmap 109 may indicate whether the stripe associated with the entry has valid data or alternatively, "zero" data. Valid data in a stripe may be indicated by a "1" in the entry associated with a stripe while zero data may be indicated by a "0" in the entry associated with the stripe. Data in a stripe is considered zero data if no data has been written to the stripe for a current build of the array, or if the data in the stripe has been otherwise deleted. Thus, when an array or volume is created, all entries in the bitmap 109 associated with the array may be set to "0" by the module 100. When a stripe is subsequently written to, the module 100 may set the entry associated with the stripe in the bitmap 109 to "1". When the data in a stripe is deleted, the module 100 may set the entry associated with stripe in the bitmap 109 to "0". In some implementations, when a change is made to an entry in the bitmap 109, the module 100 also persists the changes in a metadata area associated with the array. For example, the changes may be logged or journaled.

The thin disk layer 107 may intercept I/Os made by the RAID stack 105 to the volumes 111a-111d. Where the I/Os are read I/Os, the thin disk layer 107 may first determine which stripe that the chunks or chunks associated with the read I/O are part of, and may find the corresponding entry for the stripe in the bitmap 109. If the entry associated with the stripe in the bitmap 109 is a "0", then the data in the stripe is zero data and the thin disk layer 107 may return the zero data to the RAID stack 105 without providing the I/O to the volumes 111a-111d. If the entry associated with the stripe in the bitmap 109 is a "1", then the data in the stripe has been written to and the thin disk layer 107 may provide the I/O to the volumes 111a-111d for processing as normal. As may be appreciated, by only fulfilling read I/Os from the volumes 111a-111d for data that is known to be valid and non-zero, the overall responsiveness and performance of the array may be improved by the module 100.

Where the intercepted I/Os are write I/Os, the thin disk layer 107 may first determine which stripe that the chunks or chunks associated with the write I/O are part of, and may find the corresponding entry for the stripe in the bitmap 109. If the entry associated with the stripe in the bitmap 109 is a "1", then the data in the stripe is non-zero data and the I/O is passed to the volumes 111a-111d as normal. If the entry associated with the stripe in the bitmap 109 is a "0", then the data in the stripe is zero data and this is the first time that the stripe will be written to. Accordingly, the thin disk layer 107 may change the entry associated with the stripe in the bitmap 109 to a "1", and may pass the write I/O to the volumes 111a-111d as normal. In addition, in some implementations, the thin disk layer 107 may modify the write I/O to write zeros or other data to the portions or chunks of the stripe that are not written to by the write I/O. Thus, initially a full stripe of data is written to every strip in the array even if the write I/O is only a partial write.

The thin RAID layer 103 may intercept I/O from the operation system/application layer 101. For a write I/O, the thin RAID layer 103 may pass the I/O to the RAID stack 105 for processing. For a read I/O, the thin RAID layer 103 may first determine which stripe that the chunk or chunks associated with the read I/Os are part of, and may find the corresponding entry for the stripe in the bitmap 109. If the entry is a "1" then the data stored in the stripe is non-zero and the thin layer 103 may pass the read I/O to the RAID stack 105 for processing as normal. If the entry is a "0", then the data stored in the stripe is zero data, and the thin RAID layer 103 may not provide the read I/O to the RAID stack 105. Instead, the thin RAID layer 103 may return the zero data to the operating system layer 101, or may generate some error to the operating system/application layer 101 that the read I/O is not valid or otherwise cannot be processed.

As can be appreciated, the bitmap 109 of the module 100 may be able to increase the performance of many RAID related operations besides read I/Os described above. With respect to the initialization operation described previously, the speed of initialization operation may be greatly increased by only writing stripes and parity data for stripes that have a "1" entry associated with them in the bitmap 109. Accordingly, where an array is new (i.e., all entries in the bitmap are "0"); the initialization process may be almost instantaneous.

In some implementations, when the RAID stack 105 starts the initialization process by providing initialization related I/Os to the volumes 111a-111d, the thin disk layer 107 may intercept the I/Os and may determine which I/Os are associated with stripes having "1" in their corresponding entries in the bitmap 109. These I/Os may then be passed to the volumes 111a-111d by the thin disk layer 107 as normal. The I/Os that are associated with stripes having "0" in their corresponding entries in the bitmap 109 may be discarded by the thin disk layer 107 without providing them to the volumes 111a-111d. In addition, in some implementations, the thin disk layer 107 may generate and send messages to the RAID stack 105 purporting that the discarded I/Os were completed by the volumes 111a-111d.

The speed of RAID rebuild operations may similarly be improved by the module 100. For example, the thin disk layer 107 may intercept rebuilding related I/Os and skip those I/Os associated with stripes having corresponding "0" bitmap 109 entries. Background patrol read operations and check-consistency operations may also be greatly sped up by discarding I/Os for stripes having corresponding "0" bitmap 109 entries.

The performance of RAID level migrations and online capacity expansions can also be improved by the module 100. For example, with respect to the RAID level migrations, only stripes having "1" entries in the bitmap 109 may be copied to the new array, and the entries in the bitmap 109 of the source array may be used to populate the entries in the bitmap 109 of the target array.

In some implementations, the module 100 may further be used to help the RAID stack 105 recover from one or more medium errors. For example, when a medium error such as a bad block error is received by the thin disk layer 107, a determination may be made as to whether the entry for the stripe associated with the bad block error in the bitmap 109 is a "0". If so, then thin disk layer 107 may disregard the bad block error without providing it to the RAID stack 105. Because the stripe associated with the bad block error has zero data, there may be no need for the RAID stack 105 to recover from the error.

In implementations using RAID-6, the functionality of the module 100 and the bitmap 109 described above may be extended using the P and Q syndrome blocks. In particular, the Q syndrome blocks may be used to store the entries associated with each stripe. For example, a bit value of '0' in the Q syndrome blocks may return a fixed value, which is the Q data value when all the data blocks are zeros.

Figure 2:
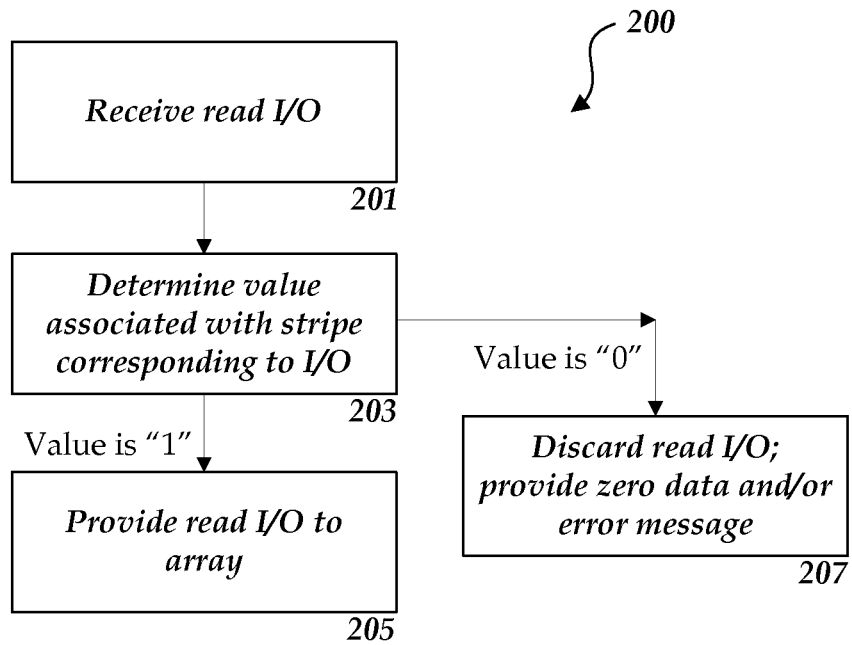
FIG. 2 is a flow diagram showing an illustrative routine for handling read I/Os using a module in a RAID system.

FIG. 2 shows a diagram of an operational flow of a method 200 for handling read I/Os by the module 100. At operation 201, a read I/O is received at the module 100. In some implementations, the read I/O may be received by the thin disk layer 107 from the RAID stack 105. In other implementations, the read I/O may be received by the thin RAID layer 103 from the operating system/application layer 101. Each read I/O may be associated with one or more chunks that are associated with a stripe of the volumes 111a-111d.

At operation 203, a value associated with the entry for the stripe corresponding to the read I/O in the bitmap 109 is determined. The determination may be made by one or more of the thin disk layer 107 or the thin raid layer 103 of the module 100. If the determined value is a "1", then the method 200 may continue at 205. Else, the determined value is a "0" and the method 200 may continue at 207.

At operation 205, the read I/O may be provided to the volumes 111a-111d by the module 100. Because the entry associated with the stripe in the bitmap 109 was a "1", the stripe contains valid data. Thus, the read I/O may be provided to, and fulfilled by, the volumes 111a-111d.

At operation 207, the read I/O may be discarded by the module 100. Because the entry associated with the stripe in the bitmap 109 was a "0", the stripe contains zero or invalid data. Thus, performance penalties associated with reading data from the volumes 111a-111d may be avoided by discarding the read I/O. In some implementations, zero data may be provided to the RAID stack 105 by the thin disk layer 107 and/or an error message may be provided to the operating system/application layer 101 by the thing RAID layer 103.

Figure 3:
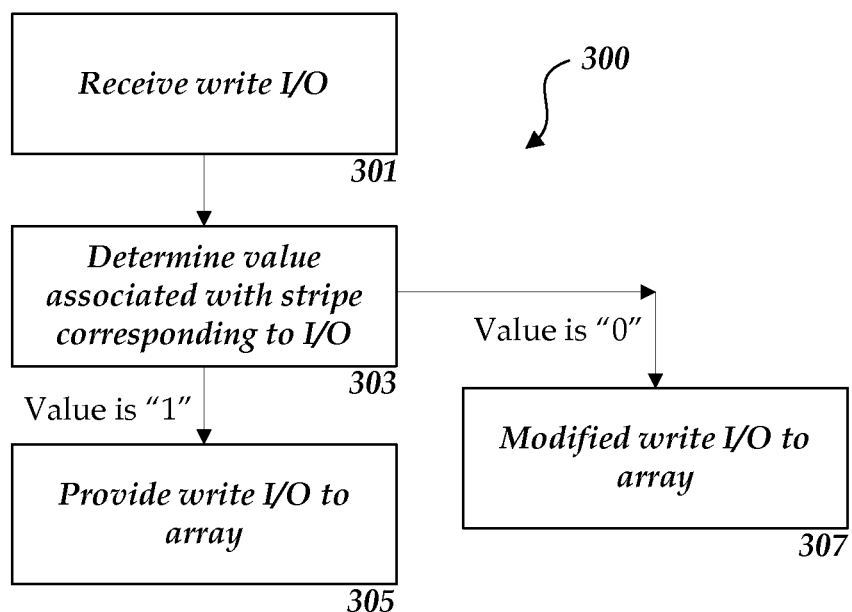
FIG. 3 is a flow diagram showing an illustrative routine for handling write I/Os using a module in a RAID system.

FIG. 3 shows a diagram of an operational flow of a method 300 for handling write I/Os by the module 100. At operation 301, a write I/O is received at the module 100. In some implementations, the write I/O may be received by the thin disk layer 107 from the RAID stack 105. Each write I/O may be associated with one or more chunks that are associated with a stripe of the volumes 111a-111d.

At operation 303, a value associated with the entry for the stripe corresponding to the read I/O in the bitmap 109 is determined. The determination may be made by one or more of the thin disk layer 107 of the module 100. If the determined value is a "1", then the method 200 may continue at 305. Else, the determined value is a "0" and the method 300 may continue at 307.

At operation 305, the write I/O may be provided to the volumes 111a-111d by the module 100. Because the entry associated with the stripe in the bitmap 109 was a "1", the stripe was written before and no additional steps may be taken by the thin disk layer 107 of the module 100. Thus, the write I/O may be provided to, and fulfilled by, the volumes 111a-111d.

At operation 307, the write I/O may be modified by the module 100 to write "0" in any chunks of the stripe not originally being written by the write I/O. The modified write I/O may be provided to, and fulfilled by, the volumes 111a-111d. Because the entry associated with the stripe in the bitmap 109 was a "0", the stripe initially contained zero or invalid data. Thus, the thin disk layer 107 may have the volumes 111a-111d overwrite the invalid data with "0" bit values. In addition, the thin disk layer 107 of the module 100 may write a "1" in the entry of the bitmap 109 corresponding to the stripe.

Figure 4:
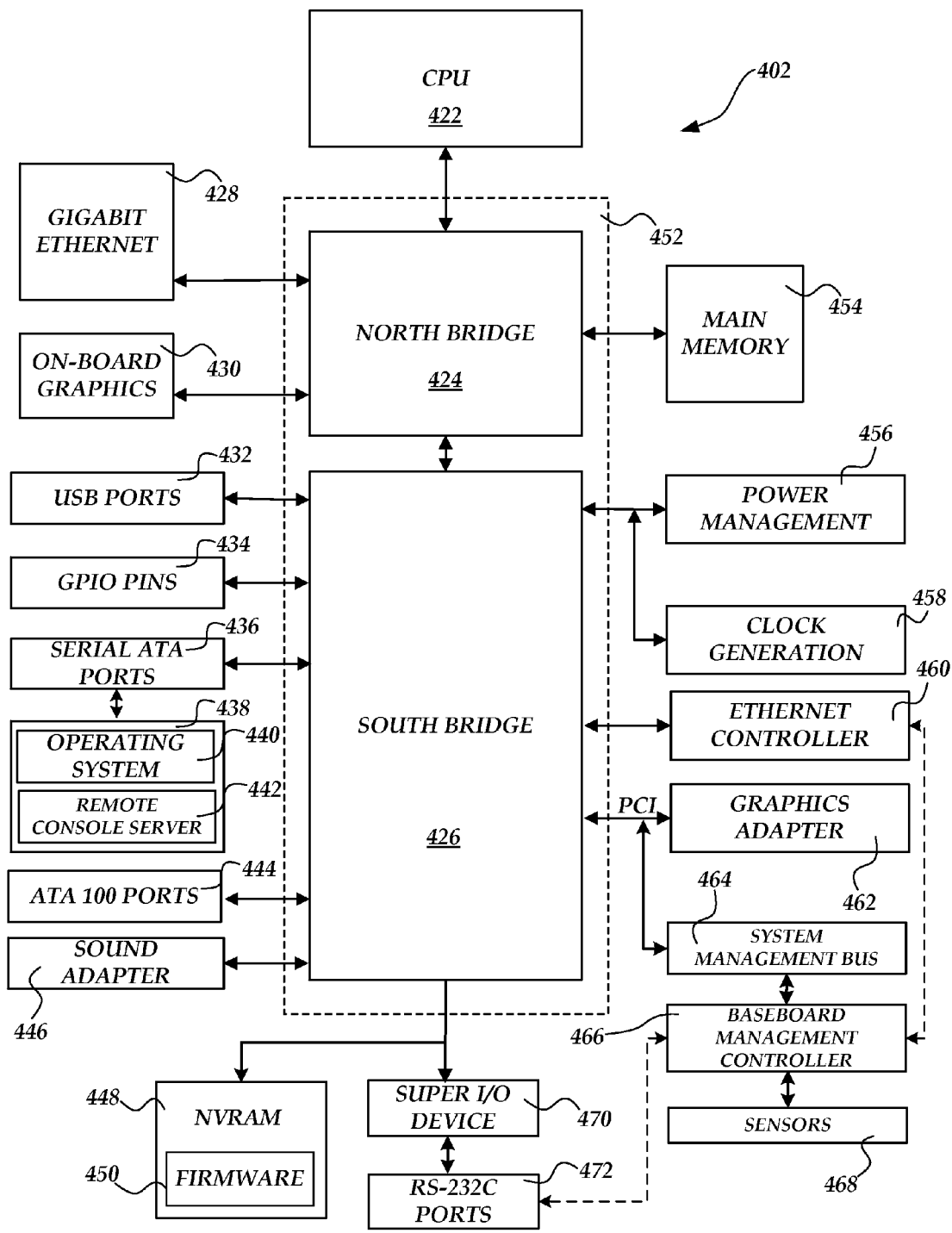
FIG. 4 is a computer architecture diagram showing an illustrative computer hardware architecture for a storage node computing system capable of implementing aspects of the embodiments presented herein.

FIG. 4 shows an illustrative computer architecture for a computer 402 capable of executing the software components described herein for implementing network RAID in a virtual storage cluster. In particular, the computer architecture shown in FIG. 4 provides a simplified view of the architecture of a conventional server computer 402 and may be utilized to implement the storage nodes 2.

FIG. 4 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The server computer 402 includes a baseboard, or "motherboard", which is a printed circuit board to which a multitude of components or devices may be connected by way of a system bus or other electrical communication path. In one illustrative embodiment, a CPU 422 operates in conjunction with a chipset 452. The CPU 422 is a standard central processor that performs arithmetic and logical operations necessary for the operation of the computer. The server computer 402 may include a multitude of CPUs 422.

The chipset 452 includes a north bridge 424 and a south bridge 426. The north bridge 424 provides an interface between the CPU 422 and the remainder of the computer 402. The north bridge 424 also provides an interface to a random access memory ("RAM") used as the main memory 454 in the computer 402 and, possibly, to an on-board graphics adapter 430. The north bridge 424 may also include functionality for providing networking functionality through a gigabit Ethernet adapter 428. The gigabit Ethernet adapter 428 is capable of connecting the computer 402 to another computer via a network. Connections which may be made by the network adapter 428 may include LAN or WAN connections. LAN and WAN networking environments are commonplace in offices, enterprise-wide computer networks, intranets, and the internet. The north bridge 424 is connected to the south bridge 426.

The south bridge 426 is responsible for controlling many of the input/output functions of the computer 402. In particular, the south bridge 426 may provide one or more universal serial bus ("USB") ports 432, a sound adapter 446, an Ethernet controller 460, and one or more general purpose input/output ("GPIO") pins 434. The south bridge 426 may also provide a bus for interfacing peripheral card devices such as a graphics adapter 462. In one embodiment, the bus comprises a peripheral component interconnect ("PCI") bus. The south bridge 426 may also provide a system management bus 464 for use in managing the various components of the computer 402. Additional details regarding the operation of the system management bus 464 and its connected components are provided below.

The south bridge 426 is also operative to provide one or more interfaces for connecting mass storage devices to the computer 402. For instance, according to an embodiment, the south bridge 426 includes a serial advanced technology attachment ("SATA") adapter for providing one or more serial ATA ports 436 and an ATA 100 adapter for providing one or more ATA 100 ports 444. The serial ATA ports 436 and the ATA 100 ports 444 may be, in turn, connected to one or more mass storage devices storing an operating system 440 and application programs, such as the SATA disk drive 438. As known to those skilled in the art, an operating system 440 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 440 comprises the LINUX operating system. According to another embodiment of the invention the operating system 440 comprises the WINDOWS SERVER operating system from MICROSOFT CORPORATION. According to another embodiment, the operating system 440 comprises the UNIX or SOLARIS operating system. It should be appreciated that other operating systems may also be utilized.

The mass storage devices connected to the south bridge 426, and their associated computer-readable media, provide non-volatile storage for the computer 402. Although the description of computer-readable media contained herein refers to a mass storage device, such as a hard disk or CD-ROM drive, it should be appreciated by those skilled in the art that computer-readable media can be any available media that can be accessed by the computer 402. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 426 for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that help to start up the computer 402 and to transfer information between elements within the computer 402.

As described briefly above, the south bridge 426 may include a system management bus 464. The system management bus 464 may include a BMC 466. In general, the BMC 466 is a microcontroller that monitors operation of the computer system 402. In a more specific embodiment, the BMC 466 monitors health-related aspects associated with the computer system 402, such as, but not limited to, the temperature of one or more components of the computer system 402, speed of rotational components (e.g., spindle motor, CPU Fan, etc.) within the system, the voltage across or applied to one or more components within the system 402, and the available or used capacity of memory devices within the system 402. To accomplish these monitoring functions, the BMC 466 is communicatively connected to one or more components by way of the management bus 464. In an embodiment, these components include sensor devices for measuring various operating and performance-related parameters within the computer system 402. The sensor devices may be either hardware or software based components configured or programmed to measure or detect one or more of the various operating and performance-related parameters. The BMC 466 functions as the master on the management bus 364 in most circumstances, but may also function as either a master or a slave in other circumstances. Each of the various components communicatively connected to the BMC 466 by way of the management bus 464 is addressed using a slave address. The management bus 464 is used by the BMC 466 to request and/or receive various operating and performance-related parameters from one or more components, which are also communicatively connected to the management bus 464.

It should be appreciated that the computer 402 may comprise other types of computing devices, including hand-held computers, embedded computer systems, personal digital assistants, and other types of computing devices known to those skilled in the art. It is also contemplated that the computer 402 may not include all of the components shown in FIG. 4, may include other components that are not explicitly shown in FIG. 4, or may utilize an architecture completely different than that shown in FIG. 4.

Based on the foregoing, it should be appreciated that technologies for providing networked RAID in a virtualized storage cluster are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method comprising:
    intercepting, by a thin disk layer located between a RAID stack and a RAID array, a read I/O that was sent from the RAID stack directed to the RAID array, wherein the RAID array comprises a plurality of stripes which are managed by the RAID stack;
    determining, by the thin disk layer, a stripe associated with the I/O;
    retrieving, by the thin disk layer, a bitmap associated with the RAID array, wherein the bitmap comprises an entry associated with each of the plurality of stripes and each entry has a corresponding value;
    determining, by the thin disk layer, that the corresponding value associated with the determined stripe in the bitmap indicates that the strip contains invalid data;
    without providing the I/O to the RAID array, discarding, by the thin disk layer, the I/O and providing, by the thin disk layer, zero data to the RAID stack as a response to the sent I/O; and
    providing, by a thin RAID layer located between the RAID stack and an operating system or application layer, an error message to the operating system or application layer indicating that the stripe contains invalid data.

2. The method of claim 1, wherein the I/O is an initialization related I/O and further comprising sending, by the thin disk layer, a message to the RAID stack purporting that the discarded I/O was received and completed by the RAID array.

3. A data storage system, comprising:
- a storage server;
- a physical storage device associated with storage server;
- a processing unit associated with the storage server; and
- one or more modules for execution on the processing unit operable to:
  - intercept, by a thin disk layer located between a RAID stack and a RAID array, a read I/O that was sent from the RAID stack directed to the RAID array, wherein the RAID array comprises a plurality of stripes which are managed by the RAID stack;
  - determine, by the thin disk layer, a stripe associated with the I/O;
  - retrieve, by the thin disk layer, a bitmap associated with the RAID array, wherein the bitmap comprises an entry associated with each of the plurality of stripes and each entry has a correspond value;
  - determine, by the thin disk layer, that the corresponding value associated with the determined stripe in the bitmap contains invalid data;
  - without providing the I/O to the RAID array, to discard, by the thin disk layer, the I/O and to provide, by the thin disk layer, zero data to the RAID stack as a response to the sent I/O; and
  - provide, by a thin RAID layer located between the RAID stack and an operating system or application layer, an error message to an operating system or application layer indicating that the stripe contains invalid data.

4. The data storage system of claim 3, wherein the I/O is an initialization related I/O, and wherein the one or more modules for execution on the processing unit are further operable to send, by the thin disk layer, a message to the RAID stack purporting that the discarded I/O was received and completed by the RAID array.

\* \* \* \* \*